United States Patent [19]

Brilando

[11] Patent Number: 4,509,767
[45] Date of Patent: Apr. 9, 1985

[54] BICYCLE CHAIN HANGAR

[75] Inventor: Frank P. Brilando, Niles, Ill.

[73] Assignee: Schwinn Bicycle Company, Chicago, Ill.

[21] Appl. No.: 553,052

[22] Filed: Nov. 18, 1983

[51] Int. Cl.³ ............................................. B62H 13/00
[52] U.S. Cl. ................................ 280/289 R; 474/273; 411/387; 411/424; 411/546
[58] Field of Search .................. 474/140, 273; 280/281 R, 289 R; 411/387, 386, 411, 418, 420, 424, 546

[56] References Cited

U.S. PATENT DOCUMENTS

| 340,629 | 4/1886 | Silver | 474/273 X |
| 2,392,059 | 1/1946 | O'Neil | 411/387 X |
| 2,678,565 | 5/1954 | Bryer | 474/273 |
| 4,016,795 | 4/1977 | Gill | 411/387 |

Primary Examiner—Stephen J. Novosad
Assistant Examiner—Frank H. McKenzie, Jr.
Attorney, Agent, or Firm—McCaleb, Lucas & Brugman

[57] ABSTRACT

A chain hangar for a bicycle seat stay tube comprising an elongated body having a driving head and a drill bit at opposite end portions, an intermediate portion with self-tapping external screw threads sized to engage a bore made by the drill bit, and a stop shoulder immediately behind the screw threads to engage the wall of the seat stay tube.

3 Claims, 6 Drawing Figures

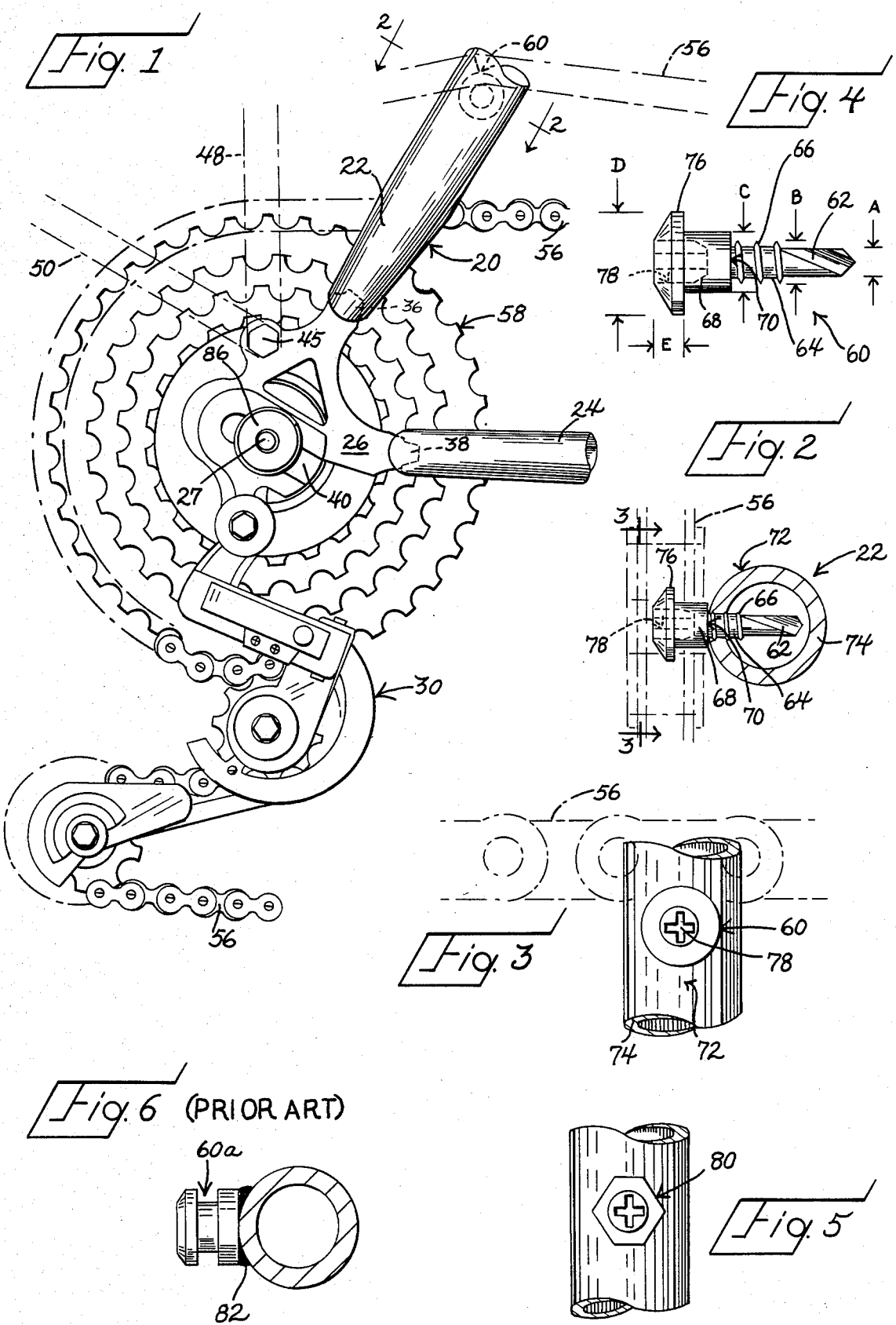

BICYCLE CHAIN HANGAR

BACKGROUND OF THE INVENTION

This invention is an improved chain hangar for a bicycle.

A chain hangar is used on some quality bicycles and comprises a part secured to the inside of a bicycle rear seat stay tube just above the rear wheel drive sprocket assembly. It provides a temporary support or "hangar" for the drive chain during maintenance or repair of the deraillieur or other parts of the rear axle assembly.

A conventional chain hangar is a small, spool-shaped metal part brazed or welded to the seat stay tube. It is factory installed prior to painting to avoid burning the paint by the heat of the brazing or welding operation. It is awkward and costly to replace in a bicycle dealer's service shop, or in the field, because some or all of the rear wheel assembly must be removed to get access to the seat stay tube and it must be re-sanded and re-painted.

SUMMARY OF THE INVENTION

A general object of the present invention is to provide a chain hanger which is readily attached to and removed from a bicycle seat stay tube without disassembling the bicycle and without re-painting the rear fork afterward.

A specific object of the invention is to provide a chain hangar in the form of an elongated body having a driving head and a drill bit at opposite ends and having an intermediate portion with self-tapping, external screw threads sized to fit into a bore made by the drill bit, and a stop shoulder immediately behind the screw threads frictionally engageable with the outside surface of a seat stay tube to maintain the screw threads engaged within the seat stay tube wall.

BRIEF DESCRIPTION OF THE DRAWINGS

Other objects and advantages will be apparent from the following description taken in connection with the accompanying drawings in which:

FIG. 1 is a right side view of a bicycle rear axle assembly showing in broken lines a preferred form of and location for the present invention;

FIG. 2 is an enlarged cross-sectional view of FIG. 1 taken along line 2—2;

FIG. 3 is a view of FIG. 2 taken in the direction of arrows 3—3;

FIG. 4 is an enlarged side view of the chain hangar shown in the previous figures;

FIG. 5 is a view similar to FIG. 3 of a modified form of the invention; and

FIG. 6 is a view similar to FIG. 2 showing a conventional form of chain hangar illustrating the prior art.

Like parts are referred to by like reference characters throughout the figures of the drawing.

DESCRIPTION OF THE PREFERRED EMBODIMENT

Referring now to the specific embodiment of the invention in the drawing, FIG. 1 shows the external parts conventionally associated with a rear axle assembly of a bicycle. A bicycle frame (not shown) typically includes a rear fork 20 comprising a pair of upper, seat stay tubes 22 and a pair of lower stay tubes 24 straddling the rear wheel. The upper ends of seat stay tubes 22 are secured in the usual manner as by welding to a seat mast beneath the seat (not shown) and the forward ends of the lower stay tubes 24 are secured to a pedal crank hanger (not shown) in the same manner.

The rear ends of stay tubes 22 and 24 on each side are secured as by welding to peripheral extentions 36 and 38 of a rear fork and fitment connector 26 which supports the rear axle 27 by lock nuts 86 in a rear-axle-engaging slot 40 in the usual manner. A pair of rear fender supporting struts 48 and 50 are fastened to each connector by a bolt 45.

A chain 56 is trained about a multiple sprocket assembly 58 and a derailleur 30 in the usual manner.

Directing attention now to the improved chain hangar of the present invention, it is generally designated 60 and shown alone in FIG. 4. FIGS. 1, 2 and 3 show it assembled for use in a right hand seat stay tube 22.

The chain hangar 60 comprises an elongated body having integral therewith a hardened, pointed drill bit 62 of a diameter A at the extreme forward end thereof. Behind the drill bit an externally threaded collar 64 has hardened, self-tapping external screw threads 66 with a diameter B larger than the drill bit diameter and sized to be self-tapping into a bore made by the drill bit.

Behind the threaded collar is a neck portion 68 of a larger diameter C. It has a forwardly facing stop shoulder 70 immediately behind the screw threads 66. It is frictionally engageable with the outside surface 72 of the wall 74 of tubular seat stay 22 as shown in FIG. 2. This limits penetration of the screw threaded collar 64 into the wall of the seat stay tube and assures a positive screw-threaded connection.

A head 76 of a diameter D, enlarged with respect to the neck portion 68, has an "X"-configuration screwdriver slot 78, and is at the rear end of the body opposite the drill bit portion 62. The head also may have a hexagonal-configuration periphery 80 as shown in FIG. 5 enabling it to be rotated by means of a wrench.

To assemble the chain hangar 60, it may be chucked in a suitable power driver or tool and pressed and rotated against the seat stay tube 22. This will drill a bore of diameter A and then drive the self-tapping threads 66 into the bore until they are stopped by frictional engagement of the shoulder 70 against the outer wall surface 72 of the seat stay tube. This produces the assembly best shown in FIG. 2.

Use of the chain hangar assembled as above will be substantially the same as for conventional hangars. The axial width E of the head fits within the space between side links of chain 56. Thus, when the chain is disengaged from the derailleur 30, or other maintenance of repair work is done on the rear axle assembly, the chain can be temporarily and securely supported on the head 76 in the position shown in phantom lines in FIGS. 1, 2 and 3.

It will be apparent from the above that the improved chain hangar 60 can easily and positively be assembled on a seat stay after a bicycle frame has been completely painted and finished, providing a saving in labor and energy costs. Further, it can readily be removed and replaced by a bicycle owner or repair shop personnel, using a readily available tool, namely a screwdriver or wrench.

By contrast, the conventional spool-type chain anchor 60a (FIG. 6) must be factory installed prior to painting to avoid damage to the paint from the heat generated incidental to deposition of brazing or welding metal at 82.

The embodiments described and shown to illustrate the present invention have been necessarily specific for purposes of illustration. Alterations, extensions and modifications would be apparent to those skilled in the art.

The embodiments of the invention in which an exclusive property or privilege is claimed are defined as follows:

1. A bicycle chain hangar in combination with a bicycle seat stay comprising:
    an elongated body;
    a hardened, pointed drill bit of one diameter at the extreme forward end thereof and an externally threaded collar behind said drill bit having hardened, self-tapping external screw threads with a diameter larger than said one diameter and sized to be self-tapping into a bore made by the drill bit;
    a diametrically enlarged neck portion immediately behind said threaded collar and having at the rear end of said threaded collar a forwardly facing stop shoulder engaged with the outer surface of a bicycle seat stay; and
    a further diametrically enlarged head portion behind said neck portion engageable within a bicycle chain to furnish stationary support therefor during maintenance or repair;
    whereby said chain hangar can be removably assembled on a bicycle seat stay by pressing and rotating said drill point against the seat stay to drill a bore in the wall thereof and continuing to rotate it to self-thread the collar into the seat stay until limited by engagement with said stop shoulder.

2. A bicycle chain hangar according to claim 1 in which said head portion has tool engageable means.

3. A bicycle chain hangar comprising an elongated body having:
    a driving head and a drill bit at opposite end portions and having an intermediate portion with self-tapping external screw threads sized to fit into a bore made by the drill bit; and
    a stop shoulder immediately beind the screw threads engageable with the outside surface of a bicycle seat stay to maintain the wall of the seat stay.

* * * * *

UNITED STATES PATENT AND TRADEMARK OFFICE
CERTIFICATE OF CORRECTION

PATENT NO. : 4,509,767
DATED : April 9, 1985
INVENTOR(S) : FRANK P. BRILANDO

It is certified that error appears in the above—identified patent and that said Letters Patent is hereby corrected as shown below:

IN THE CLAIMS

Column 4, Claim 3, line 21; "maintain" should be -- engage --.

Signed and Sealed this

Sixth Day of October, 1987

Attest:

DONALD J. QUIGG

*Attesting Officer*   *Commissioner of Patents and Trademarks*